United States Patent [19]
Laukenmann et al.

[11] Patent Number: 4,655,442
[45] Date of Patent: Apr. 7, 1987

[54] X-Y POSITIONER

[75] Inventors: Erich Laukenmann; Hans Bardroff, both of Bad Neustadt, Fed. Rep. of Germany

[73] Assignee: Preh Industrieausrustungen GmbH, Bad Neustadt, Fed. Rep. of Germany

[21] Appl. No.: 713,436

[22] Filed: Mar. 19, 1985

[30] Foreign Application Priority Data

Mar. 20, 1984 [DE] Fed. Rep. of Germany ....... 3410150
Jul. 28, 1984 [DE] Fed. Rep. of Germany ....... 3427949

[51] Int. Cl.[4] .............................................. B23Q 1/04
[52] U.S. Cl. ...................................... 269/73; 74/89.21
[58] Field of Search ............................ 269/73; 254/47; 74/89.1, 89.21, 89.22, 108

[56] References Cited

U.S. PATENT DOCUMENTS 3,529,481  9/1970  Budzyn ............................. 74/89.21
3,888,272  6/1975  Larsson ............................. 74/89.21
3,918,167  11/1975 Gerber ................................ 269/73
4,462,580  7/1984  Nielsen ............................... 269/73

OTHER PUBLICATIONS

German journal, Elektronik, vol. 1, 1984.

Primary Examiner—Frederick R. Schmidt
Assistant Examiner—Judy J. Hartman
Attorney, Agent, or Firm—Woodcock Washburn Kurtz Mackiewicz & Norris

[57] ABSTRACT

The invention is of an X-Y coordinate positioning device, in which a U-shaped profiled rail is placed on a worktable. Within this rail, a lengthwise slide is moved along the X-coordinate by a first linear drive system driven by a stationary motor. Mounted on this lengthwise slide is a cross-slide for motion along the Y-coordinate. The cross-slide is moved by a second motor-driven linear drive system. In order to reduce the inertial loads, the second linear drive system includes a stationary stepping control motor, which drives a profiled toothed belt. The toothed belt engages toothed guide rollers at the ends of the cross-slide.

5 Claims, 4 Drawing Figures

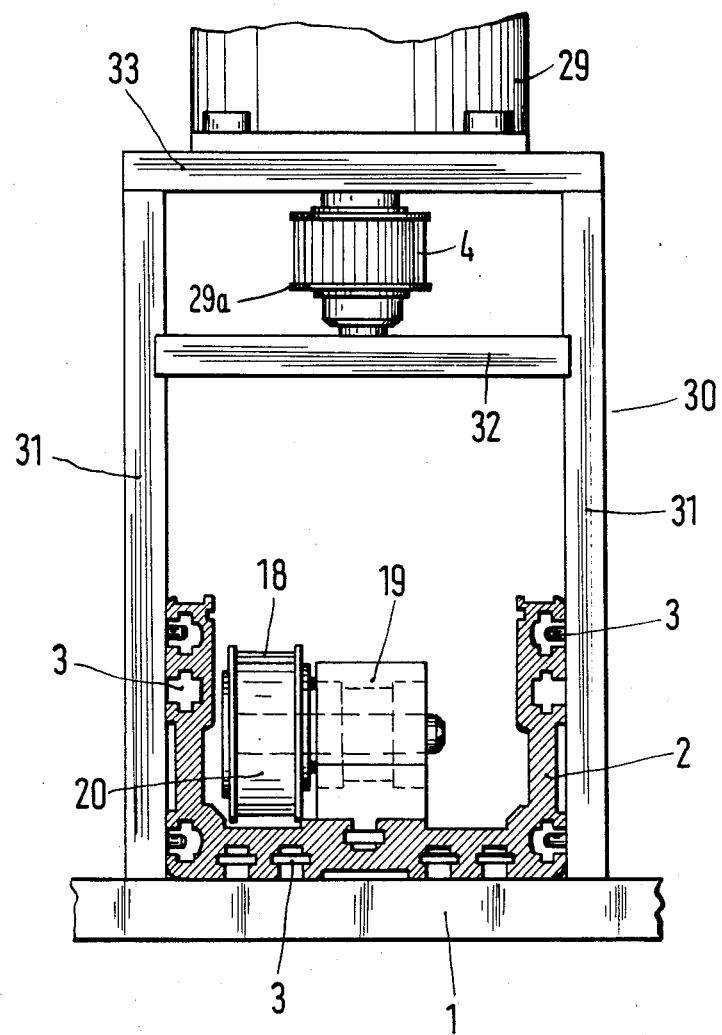

X-Y POSITIONER

FIELD OF THE INVENTION

The invention relates to an X-Y positioning machine.

BACKGROUND OF THE INVENTION

X-Y positioners are common components of various machine systems. Such positioners are of particular utility in connection with mechanization of repetitious, usually monotonous human jobs. Such devices must be capable of moving through several degrees of freedom, i.e., in several orthogonal dimensions. Typically movement in each dimension is servo-controlled, with overall control provided by a microprocessor or a computer. In most cases, positioner movement cycles are fully programmable and can be recalled or changed at will. Ordinarily a total of up to six different degrees of freedom are provided. A number of different actuator types are known, including linear units, rotary units, combinations of these, grippers, etc. The positioner according to the invention is an X-Y positioner, having linear actuators acting in orthogonal directions.

The German journal *Elektronik*, Vol. 1, p. 68, 1984, describes an X-Y coordinate positioning device in which profiled rails are placed on a worktable on either side of its working surface. Motion in the X-direction is provided by a lengthwise slide which rides in a double-track guide. This slide can be moved with a handwheel. A cross-slide for motion along the Y-axis rides atop the lengthwise slide in a similar double-track guide, and can be moved with a handwheel. In place of the handwheels, DC drive or stepping motors can be used, controlled by a microprocessor, for automatic positioning in the X- and Y-axes.

This approach is workable, but suffers from the defect that the motor for the cross-slide is carried on the lengthwise slide so that it is moved when the lengthwise slide moves along the X-axis. The weight of the cross-slide motor thus contributes to the inertial load on the lengthwise slide motor, necessarily limiting its response time.

OBJECT AND SUMMARY OF THE INVENTION

The purpose of the present invention is to provide a two-axis linear drive for an X-Y coordinate positioner in which the drive motor for the cross-slide is stationary, which reduces the inertial load to be moved. This is accomplished through use of a toothed belt driving toothed rollers at either end of the cross slide.

BRIEF DESCRIPTION OF THE DRAWINGS

The invention will be better understood if reference is made to the accompanying drawings, which may be described as follows:

FIG. 4 shows a side view of the positioning device.

DESCRIPTION OF THE PREFERRED EMBODIMENTS

Figure 3:
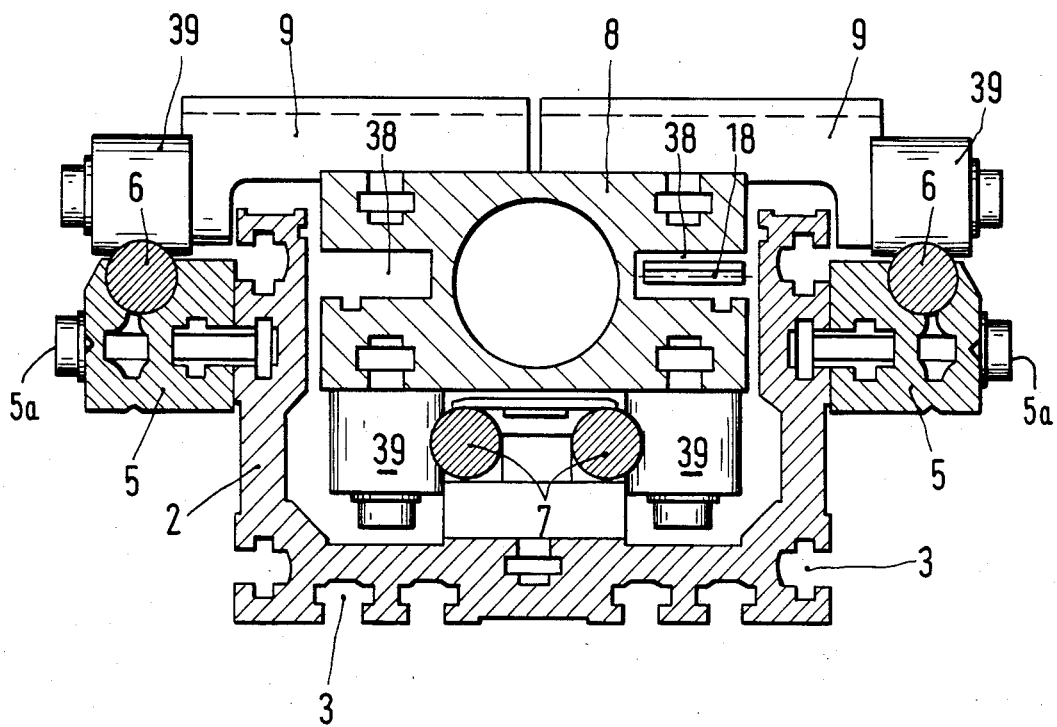
FIG. 3 shows a section through the U-shaped profiled rail.

Reference numeral 1 in FIG. 4 indicates a worktable, not described further, to which the X-Y positioner of the invention is attached. The latter comprises, among other things, a U-shaped profiled rail 2, as seen in FIG. 3. It consists of aluminum, naturally oxidized. Distributed around its periphery, preferably on the external side, are eleven grooves 3 of T-shaped cross-section within which nuts may slide, for attachment of the profiled rail in various positions, as well as for bolting on of the double-track guides. Such profiled rails can be obtained commercially, and are available in a wide variety of lengths.

Figure 1:
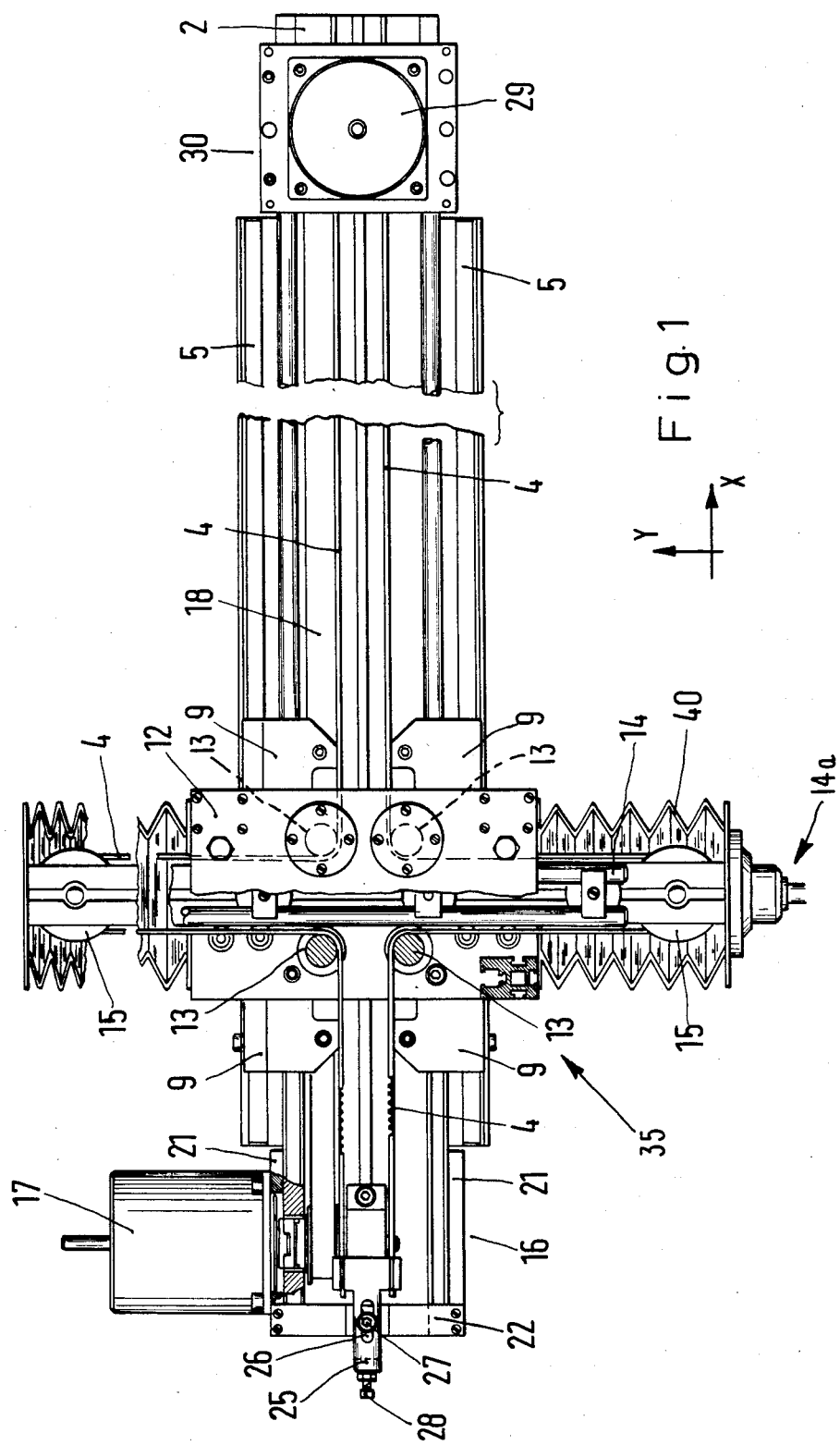
FIG. 1 shows a plan view of the positioning device, with partial cross sections.
Figure 2:
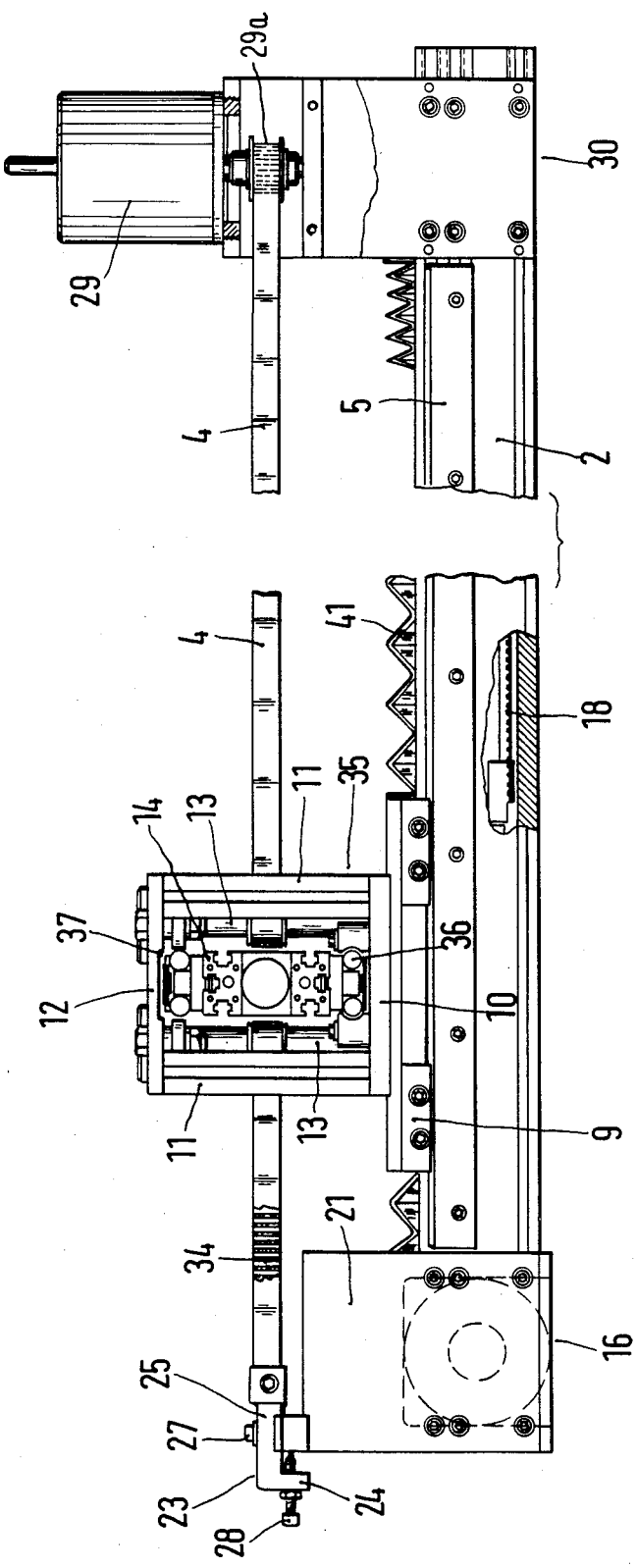
FIG. 2 shows a front view of the positioning device.

As may be seen from FIGS. 1 and 2, a support member 16 is provided at the left end of the profiled rail 2, which consists of two walls 21 placed on either side of the profiled rail 2, which are connected to one another by means of a cross-piece 22. On one side, a first stepping control motor 17, providing linear motion in the X—X direction as indicated by arrows, is attached to the wall 21. The motor drives a first toothed belt 18 either directly or through a transmission. At the other end of the profiled rail 2, as shown in FIG. 4, is a bearing block 19 with a pulley 20 which can rotate on bearings within it. The first toothed belt 18 is wrapped around this pulley 20, which causes the toothed belt 18 to run inside the U-shaped profiled rail 2. A carriage 9 is attached to the toothed belt 18. When the shaft of the stepping control motor 17 turns, the carriage 9 is therefore displaced along the X-coordinate by means of the toothed belt 18.

The carriage 9 is attached to a sliding member 8 which is mounted on a double-track guide for sliding within the U-shaped profiled rail 2. This double-track guide consists of two parallel shafts 7, which are mounted on the profiled rail 2. To permit smooth motion, the sliding member 8, as seen in FIG. 3, slides along shafts 7 on linear ball bearings 39. To provide the carriage 9 with adequate stability against, e.g., overhung loads, two further linear guides may be provided to the right and left of the U-shaped profiled rail 2, as shown in FIG. 3. These may consist of profiled rails comprising shaft-clamping channels attached to the outer side of the profiled rail 2. The rails 5 have a rounded cross section for clamp attachment of steel shafts 6, as well as T-nut cutouts for sliding nut attachment to the profiled rails 2. Bolts 5a are provided at intervals for clamping of the steel shafts 6 to the profiled rails 5. The carriage 9 is guided along the shafts 6 by means of further linear ball bearings 39.

Preferably, the linear ball bearings each consist of two endless ball races, typically each with 34 balls, arranged parallel to and opposite one another in a plastic cage. The amount of heat and abrasion produced due to rolling friction is very small.

The carriage 9 carries an assembly 35. This consists of a rectangular base plate 10, on which four posts 11 are placed, one at each of the four corners. Attached to these posts 11 is a top plate 12. Generally centered between the posts 11 are four separate direction-reversing rollers 13 mounted in bearings so they are free to rotate.

FIG. 2 shows the cross-slide rail 14 which is generally rectangular. Distributed around its periphery are a total of six cutouts of T-shaped cross-section. The profiled rail 14 also has a central cavity and is also made of aluminum, both in order to save weight. The cross-slide 14 is guided between the posts 11 on an upper double-track guide 37 and a lower double-track guide 36. These, like the previously described double-track guide 7, each consist of two shafts placed parallel to one another, on which the cross-slide 14 travels on linear ball bearings.

At each end of the cross-slide 14, a guide roller 15 is mounted for rotation. In addition, one end 14a of the cross-slide (for example) may carry a gripper head with gripping arms and pincer members, or another actuator or device. The positioner of the invention is useful with a wide variety of types of devices.

The cross-slide 14, providing motion in the Y—Y axis of FIG. 1, is driven by motor 29 through a toothed belt 4, as shown in FIG. 2, held tightly at one end of the U-shaped profiled rail 2 by a clamp. The clamp, attached between the partitions 21 on cross-member 22, consists of an angled part 23 with one long arm 25 and one short arm 24. The toothed belt 4 is attached at the free end of the long arm 25. The long arm 25 also has a lengthwise slit 26, through which an adjustment screw 27 projects, which in turn is attached to the cross member 22. With this adjustment screw 27, one can effect coarse adjustment of the tension of the toothed belt 4. Fine adjustment is made with a set-screw 28, which is attached to the short arm 24 and which contacts the cross-member 22.

Toothed belts 18 and 4 are made of polyurethane and preferably are reinforced by steel cord. This eliminates the possibility of stretching under load. Such toothed belts can be obtained commercially by the meter, and can if necessary be connected, with a special welding process, to produce endless belts. Because these toothed belts are profiled in the shape of teeth as at 34, they are well suited for non-slip operation.

As FIGS. 1 and 2 show, the ends of toothed belt 4 are gripped by a clamp located at the left side of the rail 2. Belt 4 then runs over the upper left roller 13 to the guide roller 15. From there it is driven over the upper right roller 13 (shown in phantom in FIG. 1) and out to the right of the profiled rail 2. At the right end of rail 2, belt 4 passes around a roller 29a on the shaft of a motor 29, and back leftwardly. Then belt 4 passes over the lower right roller 13 (in phantom in FIG. 1) to the lower guide roller 15, whence it is brought back over the lower left roller 13 to the clamp. As the rollers 13 serve only to alter the direction of the toothed belt, they may have flat surfaces. The two guide rollers 15, however, have teeth around their circumferences, which mesh with the teeth of the toothed belt.

The drive for this toothed belt 4 consists of a stepping control motor 29. A roller 29a is mounted on the shaft of motor 29. Roller 29a has teeth on its circumference, which mesh with the teeth of the toothed belt 4. The motor 29 can drive the toothed belt either directly or through a transmission. The stepping control motor 29 is attached to a cross-member 30 which consists of two side walls 31 placed on either side of the profiled rail, as shown in FIG. 4. The side walls are connected with a connector plate 32 and a cover plate 33 which carries the stepping control motor 29.

As the stationary stepping control motor turns, for example, clockwise in FIG. 1, the toothed belt 4 moves, causing the guide rollers 15 to turn, driving the cross slide assembly 14 from top to bottom, i.e. in the Y-coordinate. Displacement to the right or left, i.e. in the X-coordinate, is controlled by the stepping control motor 17, operating toothed belt 18, as described above.

In order to protect the profiled rail 14 against dust and other contamination, it is covered with an accordion-folded sleeve 40 made of an elastic rubber material. Similarly, the linear drive system of the profiled rail 2 is protected with an accordion-folded sleeve 41.

As shown in FIG. 3, the sliding member 8 is formed with a cutout 38 along its length for the toothed belt 18 of the first linear drive system. The toothed belt is fed through this cutout. The sliding member 8 can have such cutouts on one or both sides.

Instead of the profiled toothed belts, tightly stretched cords or V-belts could be used, since the multiple direction-reversal would also provide sufficient friction for non-slip drive.

We claim:

1. An X-Y coordinate positioning device comprising:
   a stationary unit for supporting a slide member for movement along a first coordinate axis;
   a lengthwise slide member supported for movement along said first coordinate axis by said stationary unit;
   a plurality of direction turning surfaces on said lengthwise slide member;
   a cross-slide member supported on said lengthwise slide member for movement along a second coordinate axis normal to said first coordinate axis;
   a plurality of direction-reversing guides on the cross-slide member;
   first motor-driven linear drive means stationary and coupled with said lengthwise slide member for linearly driving said slide member;
   belt means having a pair of ends attached to one end of the stationary unit and being threaded through the lengthwise slide member and said cross-slide member over said plurality of direction turning surfaces and said plurality of direction reversing guides for moving said cross-slide member along the second coordinate axis; and
   stepper motor means engaging said belt means for reversibly-driving said cross-slide member along said second axis.

2. The device of claim 1 wherein said belt means comprises a toothed belt.

3. The device of claim 2 further comprising:
   adjustable belt clamping means mounted to said stationary unit and receiving an end of said toothed belt.

4. The device of claim 3 wherein said adjustable belt clamping means comprises:
   an angled member having a short arm and a long arm, the long arm carrying a lengthwise slit; and
   attachment means projecting through the lengthwise slit for adjustably coupling the clamping means with the stationary unit and providing coarse adjustment of the toothed belt tension.

5. The device of claim 4 wherein said clamping means further comprises:
   a set screw passed through said short arm for fine adjustment of said toothed belt tension.

* * * * *